(12) United States Patent
McCauley et al.

(10) Patent No.: US 10,171,478 B2
(45) Date of Patent: Jan. 1, 2019

(54) EFFICIENT AND SECURE METHOD AND APPARATUS FOR FIRMWARE UPDATE

(71) Applicant: Faraday&Future Inc., Gardena, CA (US)

(72) Inventors: Phillip McCauley, Carson, CA (US); Jana Mahen Fernando, Torrance, CA (US); Nathan Coerper, Corona, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/639,436

(22) Filed: Jun. 30, 2017

(65) Prior Publication Data

US 2018/0145991 A1 May 24, 2018

Related U.S. Application Data

(60) Provisional application No. 62/357,303, filed on Jun. 30, 2016.

(51) Int. Cl.

| | | |
|---|---|---|
| *H04L 29/06* | (2006.01) | |
| *G06F 8/65* | (2018.01) | |
| *H04L 29/08* | (2006.01) | |
| *H04L 9/32* | (2006.01) | |
| *G06F 21/57* | (2013.01) | |
| *H04W 4/40* | (2018.01) | |

(52) U.S. Cl.
CPC ............ *H04L 63/123* (2013.01); *G06F 8/65* (2013.01); *G06F 21/57* (2013.01); *H04L 9/3247* (2013.01); *H04L 63/045* (2013.01); *H04L 63/0428* (2013.01); *H04L 63/0435* (2013.01); *H04L 63/0442* (2013.01); *H04L 67/34* (2013.01); *H04W 4/40* (2018.02)

(58) Field of Classification Search
None
See application file for complete search history.

(56) References Cited

U.S. PATENT DOCUMENTS

| 8,856,536 | B2 * | 10/2014 | Rabadi | ................. G06F 21/572 |
| | | | | 713/176 |
| 8,856,538 | B2 * | 10/2014 | Costin | ................. H04L 9/3236 |
| | | | | 380/200 |
| 2014/0032916 | A1 * | 1/2014 | Costin | ................. H04L 9/3236 |
| | | | | 713/176 |

(Continued)

OTHER PUBLICATIONS

D. K. Nilsson, L. Sun and T. Nakajima, "A Framework for Self-Verification of Firmware Updates over the Air in Vehicle ECUs," 2008 IEEE Globecom Workshops, New Orleans, LA, 2008, pp. 1-5.doi: 10.1109/GLOCOMW.2008.ECP.56 (Year: 2008).*

(Continued)

*Primary Examiner* — Jeffery L Williams
(74) *Attorney, Agent, or Firm* — Skyler R. Lund

(57) ABSTRACT

This relates to a vehicle and, more particularly to, a vehicle configured to perform a secure firmware update. Some examples of the disclosure include receiving a firmware update package including updated firmware for one or more electronic control units (ECUs) of a vehicle. According to the disclosure, the firmware update package can be transmitted to and stored on an untrusted ECU and distributed to one or more target ECUs in a secure firmware update process monitored by a secure ECU.

17 Claims, 10 Drawing Sheets

(56) References Cited

U.S. PATENT DOCUMENTS

| | | | | |
|---|---|---|---|---|
| 2014/0075579 | A1* | 3/2014 | Baltes | G06F 8/61 |
| | | | | 726/30 |
| 2017/0134164 | A1* | 5/2017 | Haga | B60R 16/023 |
| 2017/0195878 | A1* | 7/2017 | Takemori | B60R 16/023 |
| 2018/0060267 | A1* | 3/2018 | Sutton | H04L 12/40032 |

OTHER PUBLICATIONS

D. K. Nilsson and U. E. Larson, "Secure Firmware Updates over the Air in Intelligent Vehicles," ICC Workshops—2008 IEEE International Conference on Communications Workshops, Beijing, 2008, pp. 380-384.doi: 10.1109/ICCW.2008.78 (Year: 2008).*

D. K. Nilsson, L. Sun and T. Nakajima, "A Framework for Self-Verification of Firmware Updates over the Air in Vehicle ECUs,"  2008 IEEE Globecom Workshops, New Orleans, LA, 2008, pp. 1-5.doi: 10.1109/GLOCOMW.2008.ECP.56 (Year: 2008).*

D. K. Nilsson and U. E. Larson, "Secure Firmware Updates over the Air in Intelligent Vehicles," ICC Workshops—2008 IEEE International Conference on Communications Workshops, Beijing, 2008, pp. 380-384.doi: 10.1109/ICCW.2008.78 (Year: 2008).*

* cited by examiner

EFFICIENT AND SECURE METHOD AND APPARATUS FOR FIRMWARE UPDATE

CROSS-REFERENCE TO RELATED APPLICATIONS

This application claims the benefit of U.S. Provisional Application No. 62/357,303, filed Jun. 30, 3016, the entirety of which is hereby incorporated by reference.

FIELD OF THE DISCLOSURE

This relates to a vehicle and, more particularly to, a vehicle configured to perform a secure firmware update.

BACKGROUND OF THE DISCLOSURE

Vehicles, such as consumer automobiles, for example, can include one or more electronic systems. In some examples, an electronic system (e.g., one or more lights, indicator systems, actuator systems, etc.) can be controlled by one or more electronic control units (ECUs) included in the vehicle. One or more ECUs can comprise storage or memory with firmware installed thereon. Updates to the firmware can improve ECU efficiency and/or include new functionality for the ECU to perform. In some examples, security of one or more firmware updates can be important to the safety and/or performance of one or more electronic systems of a vehicle. Accordingly, there exists a need in the field of vehicle ECUs for a method and apparatus for efficient, secure firmware updating.

SUMMARY OF THE DISCLOSURE

This relates to a vehicle and, more particularly to, a vehicle configured to perform a secure firmware update. In some examples, a vehicle can include a receiver configured to receive one or more firmware updates in an encrypted package from a server. One or more ECUs within the vehicle can authenticate the package before the firmware updates are distributed to one or more target ECUs of the vehicle. Upon receiving a firmware update, each target ECU can compute and sign a checksum for the firmware update. The checksum and signature can be verified before the firmware is installed, thus ensuring its authenticity.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

Vehicles, such as consumer automobiles, for example, can include one or more electronic systems. In some examples, an electronic system (e.g., one or more lights, indicator systems, actuator systems, etc.) can be controlled by one or more electronic control units (ECUs) included in the vehicle. One or more ECUs can comprise storage or memory with firmware stored thereon. Updates to the firmware can improve ECU efficiency and/or include new functionality for the ECU to perform. In some examples, security of one or more firmware updates can be important to the safety and/or performance of one or more electronic systems of a vehicle. Accordingly, there exists a need in the field of vehicle ECUs for a method and apparatus for efficient, secure firmware updating.

This relates to a vehicle and, more particularly to, a vehicle configured to perform a secure firmware update. In some examples, a vehicle can include a receiver configured to receive one or more firmware updates in an encrypted package from a server. One or more ECUs within the vehicle can authenticate the package before the firmware updates are distributed to one or more target ECUs of the vehicle. Upon receiving a firmware update, each target ECU can compute and sign a checksum for the firmware update. The checksum and signature can be verified before the firmware is installed, thus ensuring its authenticity.

Figure 1A:
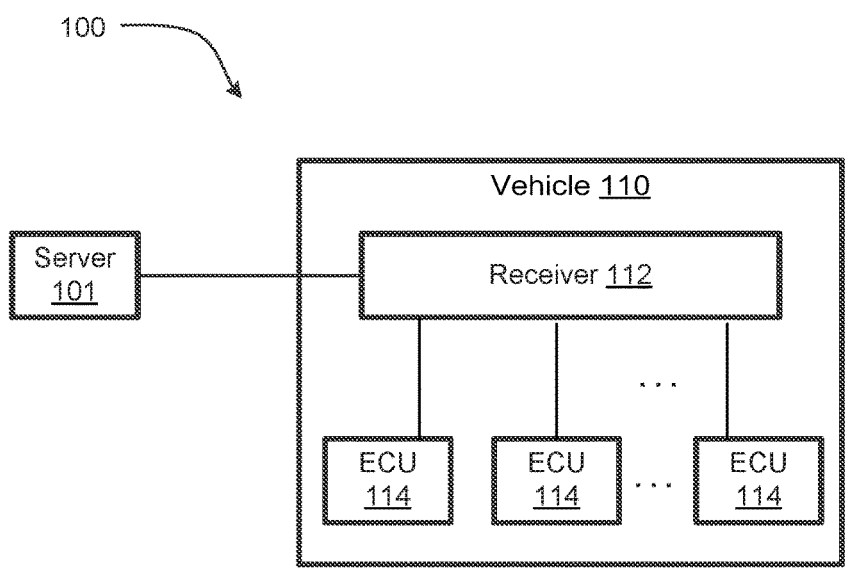
FIG. 1A illustrates an exemplary block diagram according to examples of the disclosure.

FIG. 1A illustrates an exemplary block diagram 100 according to examples of the disclosure. In some examples, server 101 can host updated firmware to be installed on one or more ECUs 114 of vehicle 110. Vehicle 110 can further include a receiver 112.

In some examples, receiver 112 can be operatively coupled to the one or more ECUs 114 included in vehicle 110. The connection between receiver 112 and ECUs 114 can be wired or wireless, for example. Receiver 112 can be communicatively coupled to server 101 via a wireless network connection (e.g., via Wi-Fi, Bluetooth, a cellular network, or other network connection). In some examples, receiver 112 can be configured for receiving a firmware update from server 101 and transmitting the firmware update to the appropriate ECUs 114. For example, a firmware update can include a package with a plurality of firmware updates, each update designated for one or more of the plurality of ECUs 114 included in vehicle 110. In some examples, firmware updates for each ECU 114 can be received one at a time in series, or simultaneously in a parallel operation.

Although block diagram 100 has been described as shown in FIG. 1A, in some examples, additional or alternative components and/or arrangements are possible. For example, server 101 can be operatively coupled to a plurality of vehicles. In some examples, a connection between server 101 and receiver 112 can be a wired connection. Vehicle 110 can further include additional components, including but not limited to microcontrollers, actuator systems, and indicator systems, for example. In some examples, ECUs 114 can include specialized hardware such as processors, controllers, and storage. ECUs 114 can be configured to control one or more vehicle functions (e.g., power management, actuators, indicators, emergency and/or entertainment features, etc.).

Figure 1B:
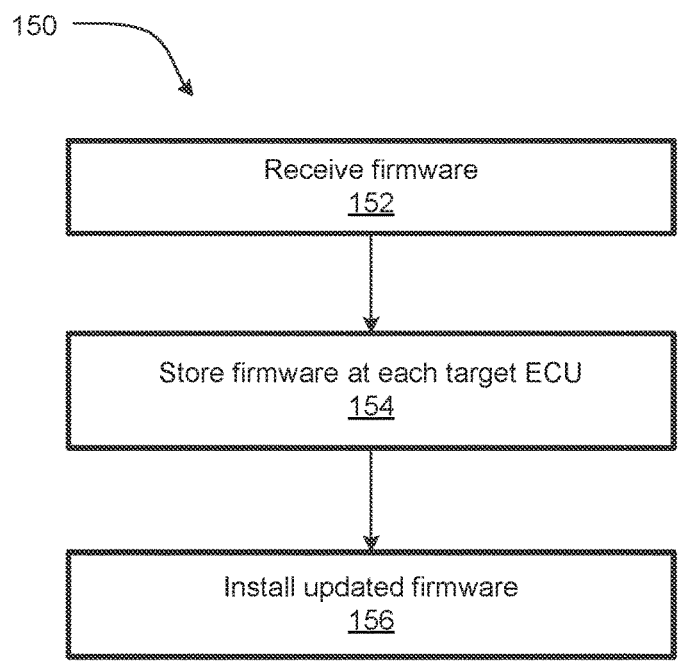
FIG. 1B illustrates an exemplary firmware update process according to examples of the disclosure.

FIG. 1B illustrates an exemplary firmware update process 150 according to examples of the disclosure. In some examples, receiver 112 can receive a firmware update from server 101 (step 152 of process 150). The received firmware can be transmitted to each target ECU 114 by receiver 112, and stored at each target ECU 114 (step 154 of process 150). The updated firmware can be installed at each target ECU 114, allowing the ECUs 114 to operate with updated firmware (step 156 of process 150). Although process 150 has been described as shown in FIG. 1B, in some examples, a firmware update process can include additional or alternative steps. In some examples, steps shown here may be deleted or performed in a different order or by different components than those described here without departing from the scope of the claimed subject matter.

In some examples, due to the specialized and limited functionality of one or more ECUs 114 of vehicle 110, the ECUs 114 may not have sufficient computing power to perform decryption operations, for example. Accordingly, firmware update process 150 may use unencrypted firmware updates, which may not be secure. In some examples, it can be advantageous to additionally provide a secure ECU configured for performing encrypting operations and securely storing a firmware update for a vehicle, as will be described with reference to FIGS. 2A-2B.

Figure 2A:
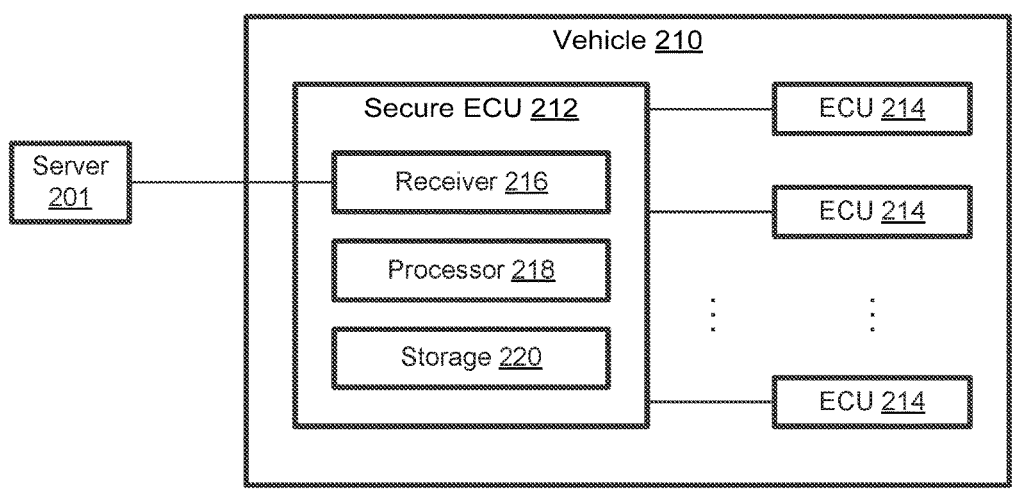
FIG. 2A illustrates an exemplary block diagram according to examples of the disclosure.

FIG. 2A illustrates an exemplary block diagram 200 according to examples of the disclosure. In some examples, server 201 can host updated firmware to be installed on one or more ECUs 214 of vehicle 210. Vehicle 210 can further include a secure ECU 212 that includes a receiver 216, processor 218, and storage 220. Secure ECU 212 can comprise specialized circuitry to make it resistant to tampering, thus making it secure.

In some examples, secure ECU 212 can be operatively coupled to the plurality of ECUs 214 included in vehicle 210. The connection can be wired or wireless, for example. Receiver 216 can be communicatively coupled to server 201 via a wireless network connection (e.g., via Wi-Fi, Bluetooth, a cellular network, or other network connection). Secure ECU 212 can further include storage 220 and processor 218. In some examples, a firmware update can include a package including a plurality of firmware updates, each update designated for one or more of the plurality of ECUs 214 included in vehicle 210. Receiver 216 can be configured for receiving a firmware update from server 201. Upon receiving a firmware update, secure ECU 212 can store the updated firmware in storage 220 and decrypt (e.g., if the updated firmware is encrypted) and/or authenticate it using processor 218. In accordance with a determination that the firmware is authentic, secure ECU 212 can transmit the firmware update(s) to the appropriate ECUs 214. In some examples, firmware updates for each ECU 214 can be received by receiver 216 one at a time in series, or simultaneously in a parallel operation.

Although block diagram 200 has been described as shown in FIG. 2A, in some examples, additional or alternative components and/or arrangements are possible. For example, server 201 can be operatively coupled to a plurality of vehicles. Vehicle 210 can further include additional components, including but not limited to microcontrollers, actuator systems, and indicator systems, for example. In some examples, ECUs 214 can include specialized hardware such as processors, controllers, and storage. ECUs 214 can be configured to control one or more vehicle functions (e.g., power management, actuators, indicators, emergency and/or entertainment features, etc.).

Figure 2B:
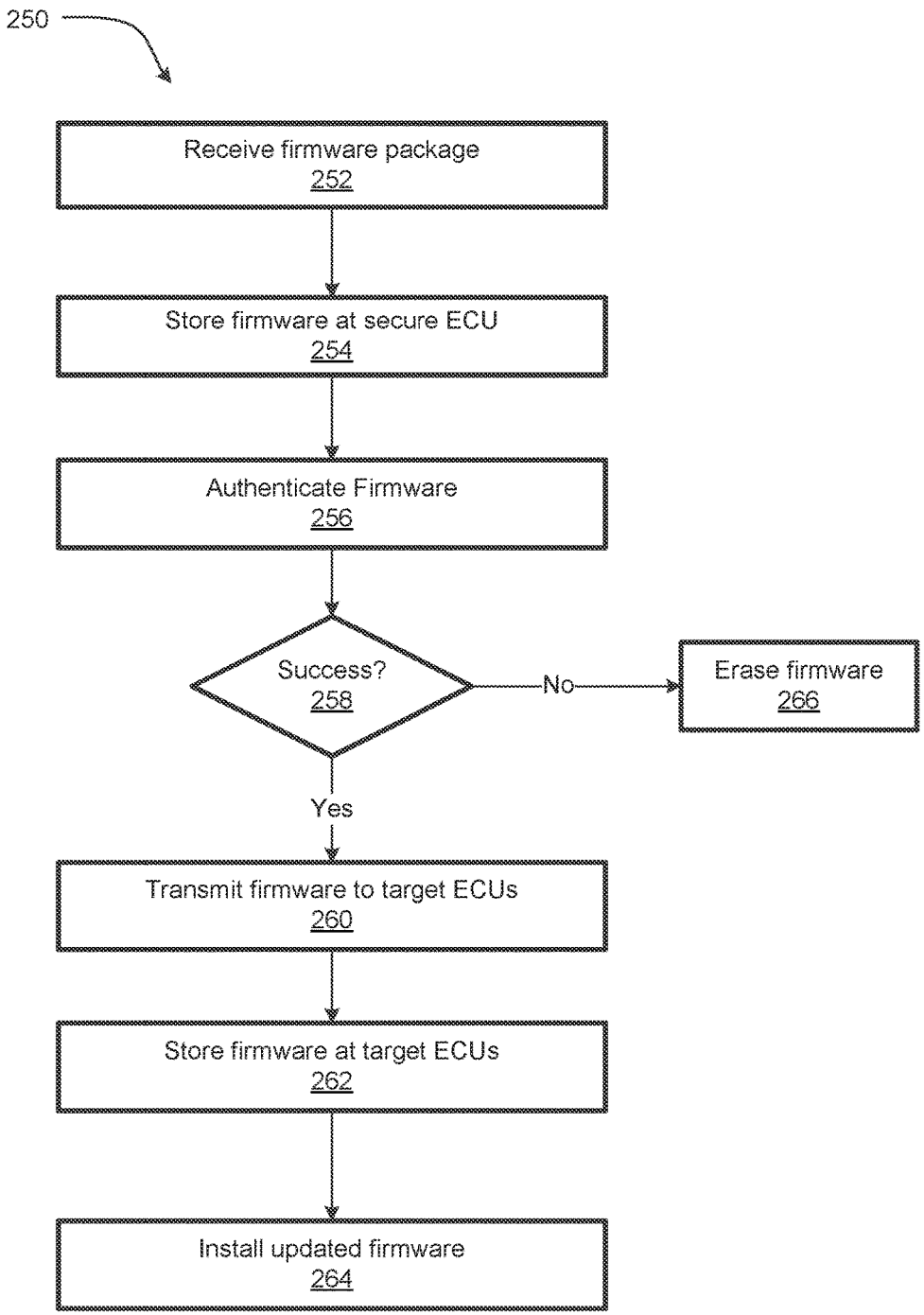
FIG. 2B illustrates an exemplary firmware update process according to examples of the disclosure.

FIG. 2B illustrates an exemplary firmware update process 250 according to examples of the disclosure. In some examples, receiver 216 of secure ECU 212 can receive a firmware package including updated firmware for one or more ECUs 214 from server 201 (step 252 of process 250). The received firmware can be stored at storage 220 of secure ECU 212 (step 254 of process 250). Secure ECU 212 can authenticate (e.g., by verifying a signed key and/or via a decrypting operation) the updated firmware (e.g., using processor 218) (step 256 of process 250). If the firmware update is valid, that is, if it has not been compromised during transmission from server 201 to secure ECU 212, authentication can be successful (step 258 of process 250). If authentication is successful, secure ECU 212 can transmit each firmware update to the one or more appropriate target ECUs 214 (step 260 of process 250). The updated firmware can be stored at each target ECU 214 (step 262 of process 250). Once stored, the firmware can be installed at each target ECU 214, allowing the ECUs 214 to operate with updated firmware (step 264 of process 250).

If the firmware update is not valid, that is, if it may have been compromised during transmission from server 201 to secure ECU 212 or may not have originated from server 201, authentication may not be successful (step 258 of process 250). If authentication is not successful, secure ECU 212 can erase the firmware without transmitting it to target ECUs 214 (step 266 of process 250). In some examples, compromised firmware may be resistant to erasure, but can be identified as inauthentic before it is transmitted to target ECUs 214, and thus, not transmitted to the target ECUs 214. Although process 250 has been described as shown in FIG. 2B, in some examples, a firmware update process can include additional or alternative steps. In some examples, one or more steps shown here may be deleted or performed in a different order or by different components than those described here without departing from the scope of the claimed subject-matter.

Due to the large secure storage requirements of secure ECU 212 included in vehicle 210 and the high cost of secure hardware, the cost of vehicle 210 may make firmware update process 250 infeasible. Further, one or more firmware updates may be compromised while being transmitted from secure ECU 212 to one or more target ECUs 214 without detection. Therefore, in some examples, it can be advantageous to authenticate and/or decrypt one or more firmware updates using target ECUs 214 themselves, as will be described with reference to FIGS. 3A-3B.

Figure 3A:
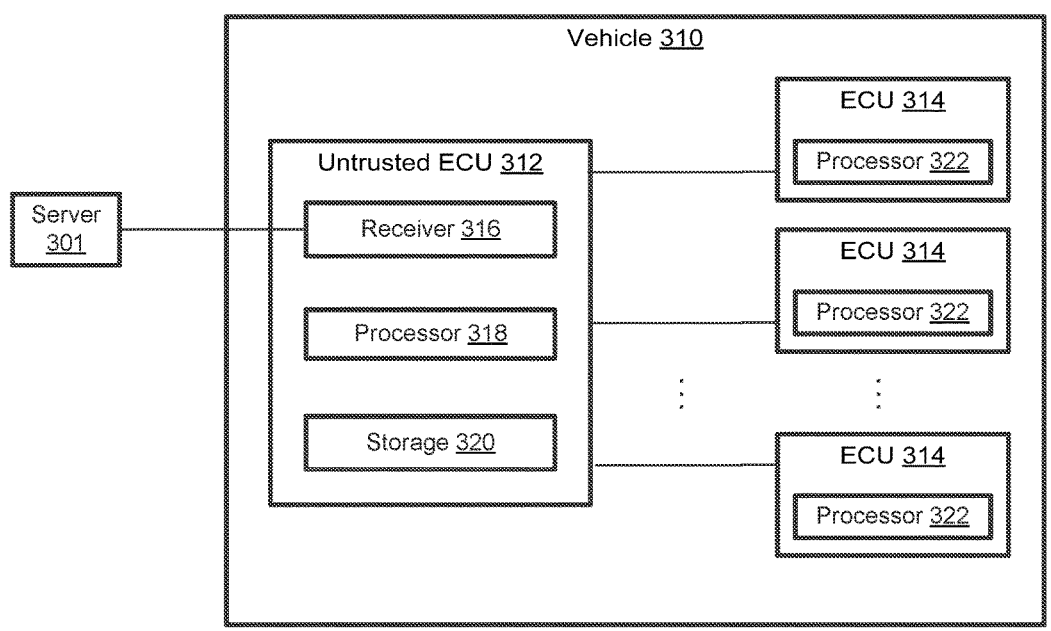
FIG. 3A illustrates an exemplary block diagram according to examples of the disclosure.

FIG. 3A illustrates an exemplary block diagram 300 according to examples of the disclosure. In some examples, server 301 can host updated firmware to be installed on one or more ECUs 314 of vehicle 310. ECUs 314 can each include a processor 322. Vehicle 310 can further include an untrusted ECU 312 that includes a receiver 316, processor 318, and storage 320. Unlike secure ECU 212 described with reference to FIGS. 2A-2B, untrusted ECU 312 may not include specialized tamper-resistant circuitry. Therefore, it can be uncertain if data stored on untrusted ECU 312 is secure.

In some examples, untrusted ECU 312 can be operatively coupled to the plurality of ECUs 314 included in vehicle 310. The connection can be wired or wireless, for example. Receiver 316 can be communicatively coupled to server 301 via a wireless network connection (e.g., via Wi-Fi, Bluetooth, a cellular network, or other network connection). Untrusted ECU 312 can further include storage 320 and processor 318. In some examples, a firmware update can include a package including a plurality of firmware updates, each update designated for one of the plurality of ECUs 314 included in vehicle 310. Receiver 316 can be configured for receiving a firmware update from server 301. Upon receiving a firmware update, untrusted ECU 312 can store the updated firmware in storage 320 and transmit each firmware update to an appropriate target ECU 314. Processors 322 included in each target ECU 314 can authenticate and/or decrypt (e.g., if the updated firmware is encrypted) the received firmware updates. In accordance with a determination that the firmware is authentic, the firmware update(s) can be installed and executed at ECUs 314. In some examples, firmware updates for each ECU 314 can be received by receiver 316 one at a time in series or simultaneously in a parallel operation.

Although block diagram 300 has been described as shown in FIG. 3A, in some examples, additional or alternative components and/or arrangements are possible. For example, server 301 can be operatively coupled to a plurality of vehicles. Vehicle 310 can further include additional components, including but not limited to microcontrollers, actuator systems, and indicator systems, for example. ECUs 314 can include specialized hardware such as processors, controllers, and storage. ECUs 314 can be configured to control one or more vehicle functions (e.g., power management, actuators, indicators, emergency and/or entertainment features, etc.). In some examples, though ECUs 314 may include processors, controllers, and/or storage, an ECU's computing power may be limited to an extent necessary to perform one or more specific vehicle control operations.

Figure 3B:
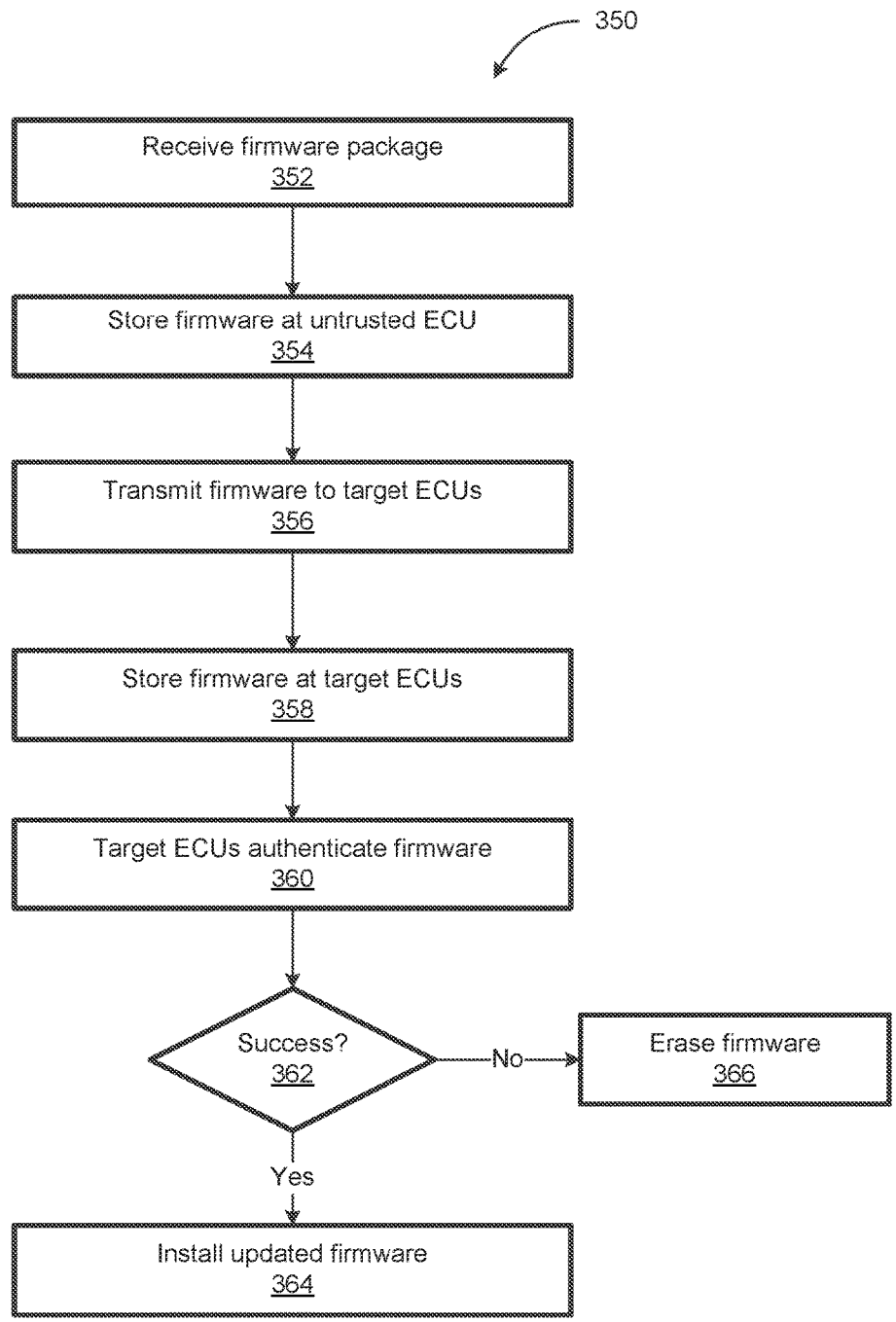
FIG. 3B illustrates an exemplary firmware update process according to examples of the disclosure.

FIG. 3B illustrates an exemplary firmware update process 350 according to examples of the disclosure. In some examples, receiver 316 of untrusted ECU 312 can receive a firmware update package including updated firmware for one or more ECUs 314 from server 301 (step 352 of process 350). The received firmware can be stored at storage 320 of untrusted ECU 312 (step 354 of process 450). Untrusted ECU 312 can transmit each firmware update to the appropriate target ECUs 314 (step 356 of process 350). The updated firmware can be stored at each target ECU 314 (step 358 of process 350). Target ECUs 312 can authenticate (e.g., by verifying a signed key and/or by decrypting the firmware package) the updated firmware (e.g., using processors 322) (step 360 of process 350). If the firmware update is valid, that is, it has not been compromised during transmission from server 301 to untrusted ECU 312 and from untrusted ECU 312 to target ECUs 314, authentication at one or more target ECUs 314 can be successful (step 362 of process 350). If authentication is successful, the updated firmware can be installed at each target ECU 314, allowing the ECUs 314 to operate with updated firmware (step 364 of process 350).

If the firmware update is not valid, that is, it may have been compromised during transmission from server 301 to untrusted ECU 312, compromised during transmission to target ECUs 314, or may not have originated from server 301, authentication may not be successful (step 362 of process 350). If authentication is not successful, target ECUs 314 can erase the firmware without installing it (step 366 of process 350). In some examples, compromised firmware may be resistant to erasure, but can be identified as inauthentic before it is installed on target ECUs 314, and thus, not installed on target ECUs 314.

Although process 350 has been described as shown in FIG. 3B, in some examples, a firmware update process can include additional or alternative steps. In some examples, steps shown here may be deleted or performed in a different order or by different components than those described here without departing from the scope of the claimed subject-matter. However, due to the large processing requirements of target ECUs 314 of vehicle 310, the manufacturing cost of vehicle 310 may make firmware update process 350 infeasible. Therefore, in some examples, it can be advantageous to authenticate a firmware update package using an untrusted ECU, and verify the package with a secure ECU, before transmitting the firmware to one or more target ECUs, as will be described with reference to FIGS. 4A-4B.

Figure 4A:
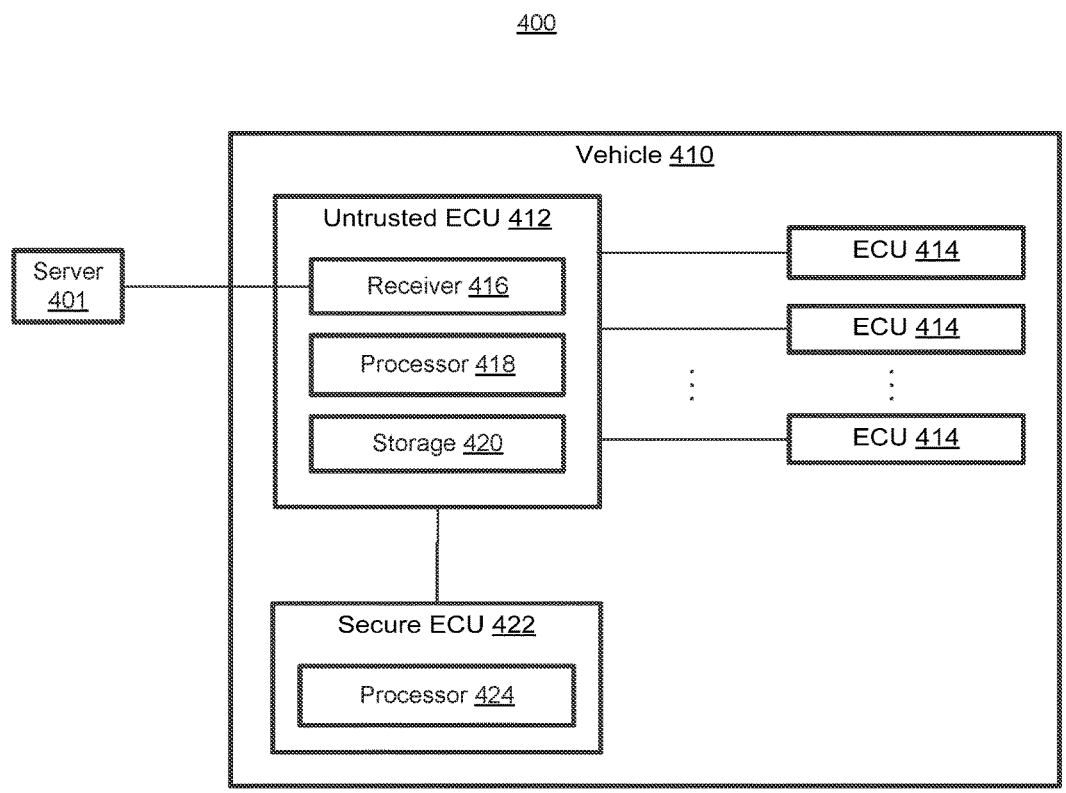
FIG. 4A illustrates an exemplary block diagram according to examples of the disclosure.

FIG. 4A illustrates an exemplary block diagram 400 according to examples of the disclosure. In some examples, server 401 can host updated firmware to be installed on one or more ECUs 414 of vehicle 410. Vehicle 410 can further include an untrusted ECU 412 and a secure ECU 422. Untrusted ECU can include a receiver 416, processor 418, and storage 420. Secure ECU 422 can include a processor 424. Secure ECU 422 can comprise specialized tamper-resistant circuitry, thus making data stored on it secure. Untrusted ECU 412 may not include specialized tamper-resistant circuitry, therefore it can be uncertain if data stored on untrusted ECU 412 is secure.

In some examples, untrusted ECU 412 can be operatively coupled to the plurality of ECUs 414 included in vehicle 410. The connection can be wired or wireless, for example. Receiver 416 can be communicatively coupled to server 401 via a wireless network connection (e.g., via Wi-Fi, Bluetooth, a cellular network, or other network connection). Untrusted ECU 412 can further include storage 420 and processor 418. In some examples, a firmware update can include a package including a plurality of firmware updates, each update designated for one or more of the plurality of ECUs 414 included in vehicle 410. Secure ECU 422 can be operatively coupled to untrusted ECU 412.

Receiver 416 can be configured for receiving a firmware update from server 401. Upon receiving a firmware update, untrusted ECU 412 can store the updated firmware in storage 420. The received firmware package can include one or more encrypted files including one or more checksums for each firmware update of the plurality of firmware updates, for example. Processors 418 included in untrusted ECU 412 can authenticate (e.g., if the firmware updates are encrypted) each received firmware update of the plurality of received firmware updates. In some examples, authentication can include determining a checksum, as will be described below, for each firmware update. Untrusted ECU 412 can be further configured for transmitting the encrypted one or more checksums to secure ECU 422. Untrusted ECU 412 can be further configured for receiving, from secure ECU 422, one or more distribution commands for each firmware update determined to be authentic (the generation of which by secure ECU 422 will be described in more detailed below). In response to one or more received distribution commands, untrusted ECU 412 can transmit one or more respective firmware updates to the appropriate one or more target ECUs 414.

Secure ECU 422 can be configured to decrypt the encrypted checksums provided in the firmware update package and compare the results to the checksums computed by processor 418 of untrusted ECU 412 to authenticate each firmware update of the plurality of firmware updates. In some examples, computing a checksum can include applying a checksum function (e.g., including one or more of a parity check, a modular sum or other arithmetic operation, and a position-dependent function) to the bits included in a firmware update. Accordingly, one or more small changes to a firmware update can yield a large difference in checksum value from the result provided from server 401, for example. For each firmware update of the plurality of firmware updates, in accordance with a determination that the firmware is authentic, secure ECU 422 can transmit a distribution command to untrusted ECU 412 to initiate distribution to one or more target ECUs 414. Target ECUs 414 can be configured to receive, store, and install updated firmware. In some examples, firmware updates for each ECU 414 can be received by receiver 416 one at a time in series or simultaneously in a parallel operation.

Although block diagram 400 has been described as shown in FIG. 4A, in some examples, additional or alternative components and/or arrangements are possible. For example, server 401 can be operatively coupled to a plurality of vehicles. In some examples, receiver 416 and server 401 can be operatively coupled via a wired connection or a wireless connection. Vehicle 410 can further include additional components, including but not limited to microcontrollers, actuator systems, and indicator systems, for example. In some examples, ECUs 414 can include specialized hardware such as processors, controllers, and storage. ECUs 414 can be configured to control one or more vehicle functions (e.g., power management, actuators, indicators, emergency and/or entertainment features, etc.). In some examples, though ECUs 414 may include processors, controllers, and/or storage, an ECU's computing power may be limited to an extent necessary to perform one or more specific vehicle control operations.

Figure 4B:
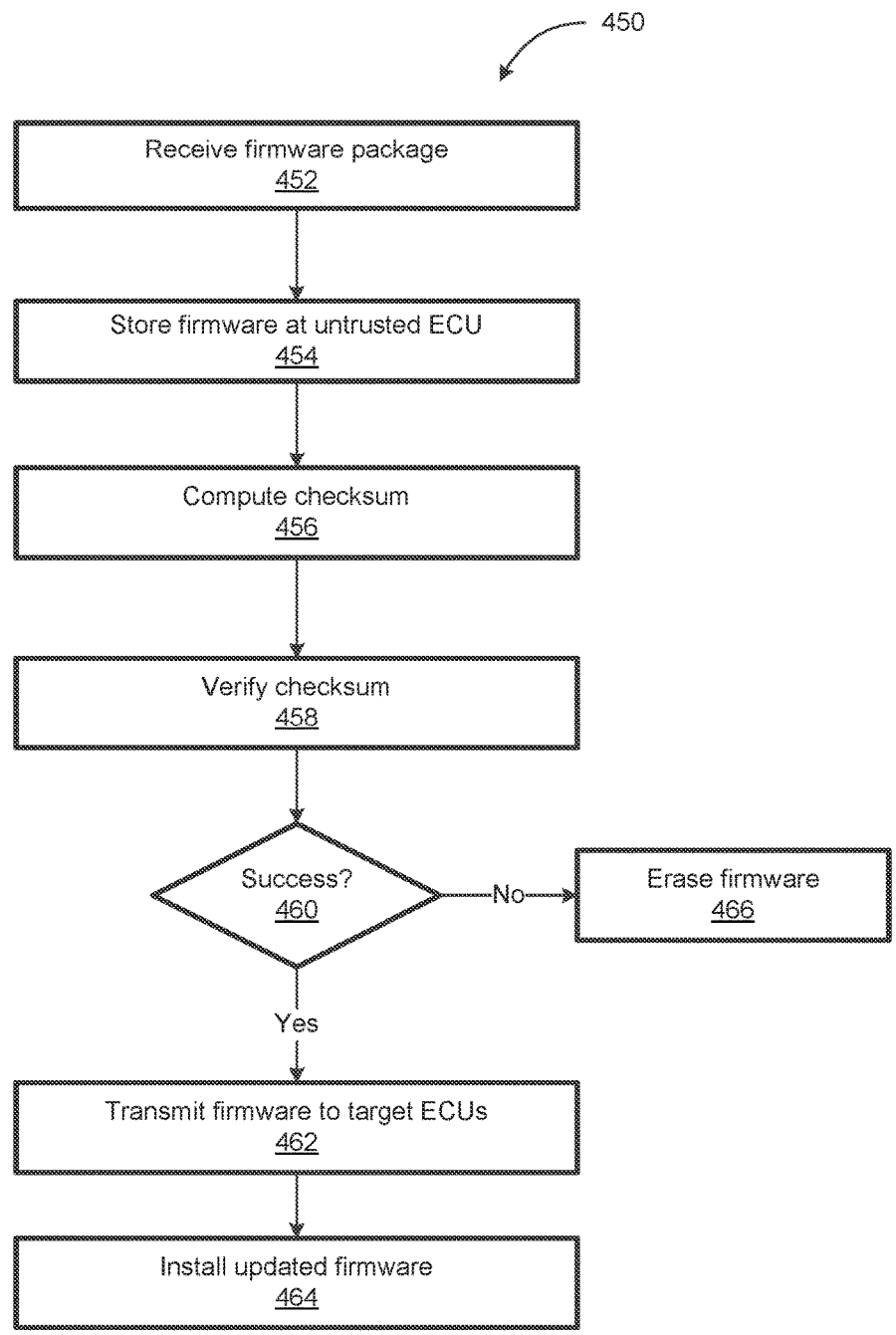
FIG. 4B illustrates an exemplary firmware update process according to examples of the disclosure.

FIG. 4B illustrates an exemplary firmware update process 450 according to examples of the disclosure. In some examples, receiver 416 of untrusted ECU 412 can receive a firmware update package including updated firmware for one or more ECUs 414 and one or more encrypted files comprising a checksum for each firmware update from server 401 (step 452 of process 450). The received firmware can be stored at storage 420 of untrusted ECU 412 (step 454 of process 450). Untrusted ECU 412 can compute a checksum for each firmware update of the plurality of firmware updates (step 456 of process 450). Secure ECU 422 can receive (e.g., from server 401 by way of untrusted ECU 412) one or more encrypted files including the checksums for each firmware update and each checksum computed by untrusted ECU 412 to verify the checksums and, accordingly, each firmware update included in the package (step 458 of process 450). If the checksums match and, accordingly, the firmware updates are valid, that is, they have not been compromised during transmission from server 401 to untrusted ECU 412, authentication at secure ECU 422 can be successful (step 460 of process 450). When authentication is successful, the updated firmware can be transmitted (e.g., from untrusted ECU 412) to each target ECU 414 (step 462 of process 450). Target ECUs 412 can install the firmware to operate with updated firmware (step 464 of process 450).

If one or more checksums may not match, one or more corresponding firmware updates may not be valid. That is, the one or more updates may have been compromised during transmission from server 401 to untrusted ECU 412 or may not have originated from server 401. In accordance with a determination that one or more checksums may not match, authentication at secure ECU 422 may not be successful (step 460 of process 450). If authentication is not successful, untrusted ECU 412 can receive an erase command from secure ECU 422 and, in response to the erase command, erase the firmware without transmitting it to the target ECUs 414 (step 466 of process 450). In some examples, compromised firmware may be resistant to erasure, but can be identified as inauthentic before it is transmitted target ECUs 414, and thus, not transmitted to target ECUs 414. In some examples, the one or more inauthentic firmware updates may not be transmitted to the one or more respective target ECUs 414. In some examples, if one or more firmware updates can be inauthentic, all firmware updates may not be transmitted to the one or more respective target ECUs 414.

Although process 450 has been described as shown in FIG. 4B, in some examples, a firmware update process can include additional or alternative steps. In some examples, steps shown here may be deleted or performed in a different order or by different components than those described here without departing from the scope of the claimed subject-matter.

Because each firmware update of the plurality of firmware updates is verified before transmission to one or more target ECUs 414, the verification procedure of FIGS. 4A-4B may not be able to detect when one or more updates are compromised during transmission from the untrusted ECU 412 to one or more target ECUs 414. Further, in some examples, authenticating each firmware update prior to transmission to the target ECUs 414 can cause an unnecessarily large processing overhead, because, generally, a successful firmware attack can be unlikely. Therefore, in some examples, it can be advantageous for a secure ECU to first verify the firmware update package before each firmware update is transmitted to the respective one or more target ECUs, and then allow each target ECU to compute and sign a checksum for its one or more firmware updates, but not install it until the computed checksum is verified at the secure ECU, as will be described with reference to FIGS. 5A-5B.

Figure 5A:
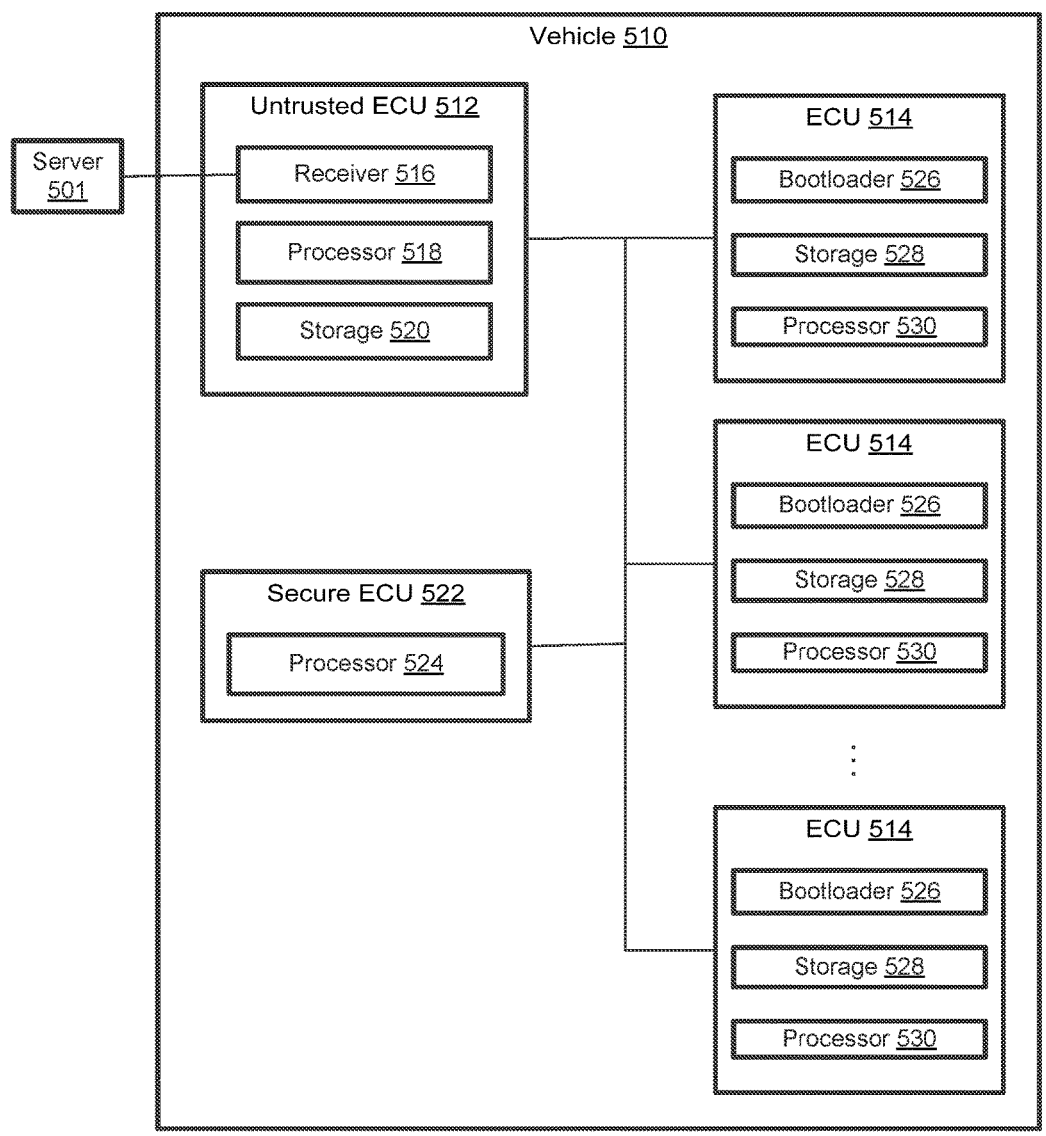
FIG. 5A illustrates an exemplary block diagram according to examples of the disclosure.

FIG. 5A illustrates an exemplary block diagram 500 according to examples of the disclosure. In some examples, server 501 can host updated firmware to be installed on one or more ECUs 514 of vehicle 510. Each ECU 514 can include a bootloader 526, storage 528, and processor 530. Vehicle 510 can further include an untrusted ECU 512 and a secure ECU 522. Untrusted ECU can include a receiver 516, processor 518, and storage 520. Secure ECU 522 can include a processor 524. Secure ECU 522 can comprise specialized tamper-resistant circuitry, thus making data stored on it secure. Untrusted ECU 512 may not include specialized tamper-resistant circuitry, therefore it can be uncertain if data stored on untrusted ECU 512 is secure.

In some examples, untrusted ECU 512, secure ECU 522, and a plurality of target ECUs 514 can be operatively coupled to each other. Each connection can be wired or wireless, for example. Receiver 516 can be wirelessly coupled to server 501 via a wireless network connection (e.g., via Wi-Fi, Bluetooth, a cellular network, or other network connection). In some examples, a firmware update can include a package with a plurality of firmware updates, each update designated for one or more of the plurality of ECUs 514 included in vehicle 510. The firmware update package can further include one or more encrypted files comprising a checksum for each firmware update.

Receiver 516 can be configured for receiving a firmware update package from server 501. Upon receiving a firmware update, untrusted ECU 512 can store the updated firmware in storage 520. In some examples, the firmware package can be asymmetrically encrypted. That is, server 501 can encrypt the firmware package using a first public key and untrusted ECU 512 can decrypt the firmware update package using a second private key. In some examples, the first public key may not work to decrypt the firmware update package once decrypted. The second private key can be kept secret, thus preventing firmware package from becoming decrypted until it is decrypted by untrusted ECU 512. Processor 518 included in untrusted ECU 512 can decrypt the firmware package and send an authenticated update command to secure ECU 522 to request to initiate a firmware update (including, e.g., transmission of each firmware update from untrusted ECU 512 to each target ECU 514)for one or more target ECUs 514. In some examples, one or more firmware updates may not begin until untrusted ECU 512 receives one or more distribution commands after the firmware update package is authenticated by secure ECU 522, as will be described in more detail below.

Target ECUs 514 can be configured to store a received firmware update in storage 528, compute a checksum using bootloader 526, sign (e.g., with a symmetric key unique to that ECU 514) the checksum and transmit it to secure ECU 524 for authentication. In some examples, computing a checksum can include applying a checksum function (e.g., including one or more of a parity check, a modular sum or other arithmetic operation, and a position-dependent function) to the bits included in a firmware update. Accordingly, one or more small changes to a firmware update can yield a large difference in checksum value from the result provided from server 501, for example. In some examples, a checksum function can be computationally simple, and can thus be performed by one or more target ECUs 514, even with limited computing resources. Each target ECU 514 can be further configured to receive an installation command from secure ECU 522 to install the updated firmware, once it has been fully authenticated by secure ECU 522, as will be described below. Installed firmware can be executed by processor 530.

Secure ECU 522 can be configured to verify the update command from untrusted ECU 512 and the checksums from target ECUs 514. For example, secure ECU 522 can ensure the update command originated from untrusted ECU 512 and the firmware package originated from server 501 and arrived uncompromised. Secure ECU 522 can be further configured for, in accordance with a determination that the update command originated from untrusted ECU 512 and the firmware package originated from server 501 and arrived uncompromised, issuing a signed distribution command to untrusted ECU 512 to distribute the updated firmware to the one or more target ECUs 514. Secure ECU 522 can be configured for, upon receiving one or more checksums from one or more target ECUs 514, verifying that the checksums are correct and originated from the correct target ECU 514, indicating that the firmware is authentic and safe to install. Secure ECU 522 can be further configured for sending an installation command to the target ECUs 514 to install the updated firmware for one or more firmware updates determined to be authentic. Secure ECU 522 can be further configured for sending an erase command to the target ECUs 514 to erase the updated firmware when the firmware is determined to be compromised. In some examples, firmware updates for each ECU 514 can be received one at a time in series or simultaneously in a parallel operation.

Although block diagram 500 has been described as shown in FIG. 5A, in some examples, additional or alternative components and/or arrangements are possible. For example, server 501 can be operatively coupled to a plurality of vehicles. In some examples, receiver 516 and server 501 can be coupled via a wired connection or a wireless connection. Although a firmware package from server 501 has been described as being asymmetrically encrypted, in some examples, the package can be symmetrically encrypted. That is, a same secret key can be used by server 501 to encrypt a firmware update package and the same secret key can be used by untrusted ECU 512 to decrypt the firmware update package. Although each firmware update has been described as being symmetrically encrypted, in some examples, asymmetric encryption is possible. Each firmware update can be encrypted by server 501 prior to transmission or by untrusted ECU 512 or secure ECU 522 upon receipt. In some examples, secure commands passed between untrusted ECU 512, secure ECU 522, and target ECUs 514 can be signed (e.g., with a symmetric or asymmetric key) prior to transmission and authenticated upon receipt. Vehicle 510 can further include additional components, including but not limited to microcontrollers, actuator systems, and indicator systems, for example. ECUs 514 can be configured to control one or more vehicle functions (e.g., power management, actuators, indicators, emergency and/or entertainment features, etc.).

Figure 5B:
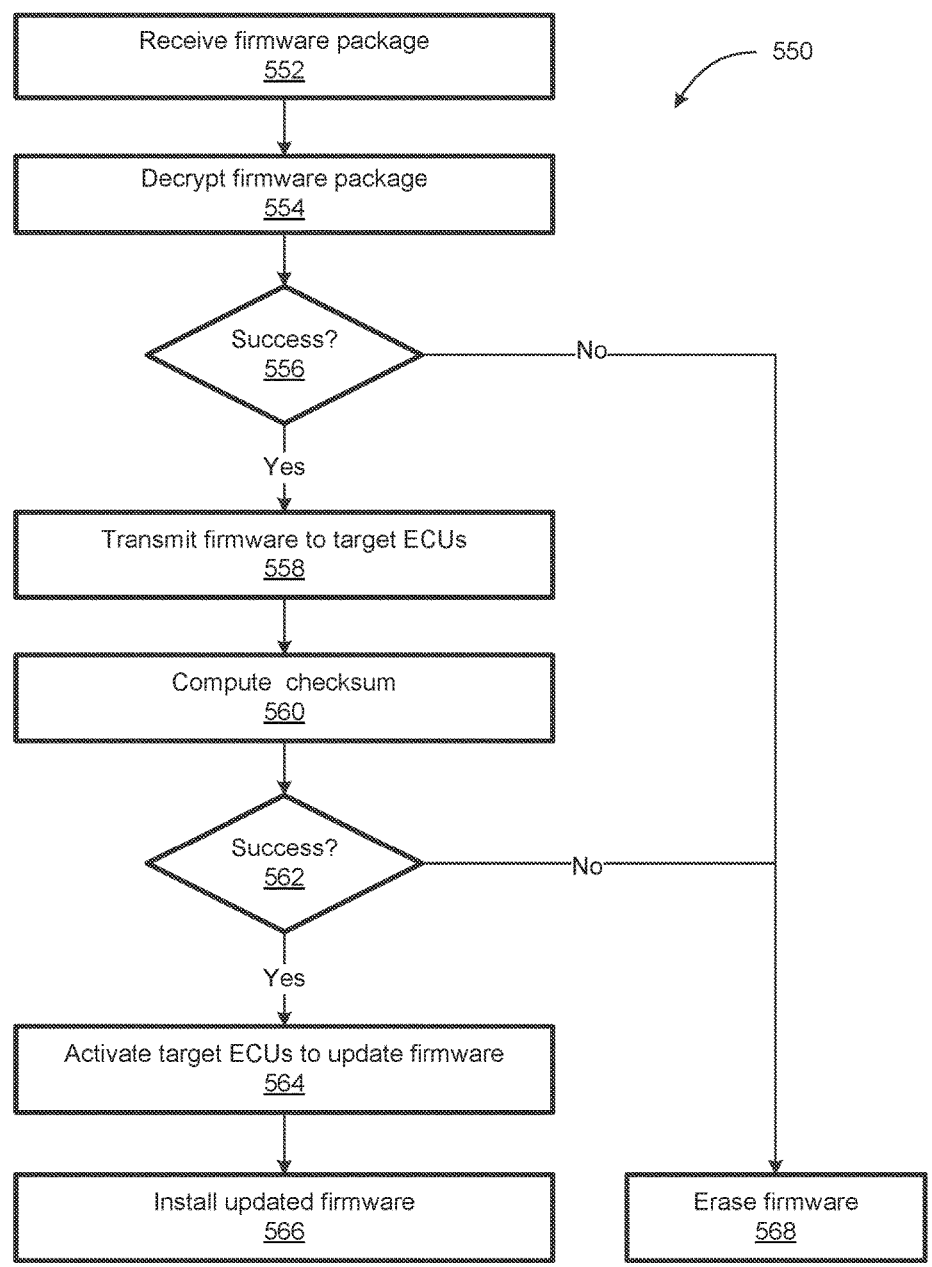
FIG. 5B illustrates an exemplary firmware update process according to examples of the disclosure.

FIG. 5B illustrates an exemplary firmware update process 550 according to examples of the disclosure. In some examples, receiver 516 of untrusted ECU 512 can receive a firmware update package including updated firmware for one or more ECUs 514 and one or more encrypted files comprising a checksum for each firmware update from server 501 (step 552 of process 550). The firmware update can be stored at storage 520 of untrusted ECU 512 in some examples. Untrusted ECU can decrypt (e.g., using processor 518) the firmware package and send a signed update command to secure ECU 522 requesting to initiate a firmware update process (step 554 of process 550). Secure ECU 522 can decrypt and/or authenticate the request to determine whether the firmware package and the request are authentic. If the firmware package and the request are authentic, authentication at secure ECU 522 can be successful (step 556 of process 550). If authentication is successful, untrusted ECU 512 can receive a signed distribution command from secure ECU 522 and, in response to the received distribution command, transmit one or more firmware updates of the plurality of firmware updates to the appropriate target ECUs 514 (step 558 of process 550). Each target ECU 514 can compute and sign a checksum for its received firmware update and transmit the signed checksum to secure ECU 522 for verification (step 562 of process 550). If the secure ECU 522 determines that the signature is authentic (e.g., by decrypting an encrypted signature) and the checksum is valid (e.g., by comparing the checksum computed by the target ECU 514 to the checksum provided by the server 501), verification can be successful (step 562 of process 550). If verification at secure ECU 522 is successful, secure ECU 522 can send a signed installation command to the one or more target ECUs 514 to install the firmware (step 564 of process 550).

If the request from untrusted ECU 512 to initiate firmware distribution is not successful, it is possible the request may not have originated from untrusted ECU 512 or the firmware package may be compromised or may not have originated from server 501 (step 556 of process 550). Likewise, if a checksum from a target ECU 514 is not successful, it is possible that the checksum may not have originated from the correct ECU 514 or the firmware update may be inauthentic (step 562 of process 550). If authentication at step 556 or 562 is not successful, secure ECU 552 can issue a signed erase command to one or more of untrusted ECU 512 and one or more secure ECUs 522 to erase the firmware (step 568 of process 550). If step 556 fails, the erase command can be transmitted from secure ECU 522 to untrusted ECU 512 and the firmware can be erased from untrusted ECU 512 before it is distributed to target ECUs 514, for example. In some examples, compromised firmware may be resistant to erasure, but can be identified as inauthentic before it is installed on target ECUs 514. If step 562 fails, the erase command can be transmitted to one or more target ECUs 514 corresponding to one or more failed checksums and firmware can be erased from one or more target ECUs 514 before it is installed and/or executed, for example. Optionally, if step 566 fails, the erase command can additionally be transmitted to untrusted ECU 512. In some examples, compromised firmware may be resistant to erasure, but can be identified as inauthentic before it is executed on target ECUs 514.

Although process 550 has been described as shown in FIG. 5B, in some examples, a firmware update process can include one or more additional or alternative steps. In some examples, one or more steps shown here may be deleted or performed in a different order or by different components than those described here without departing from the scope of the claimed subject-matter.

Figure 6:
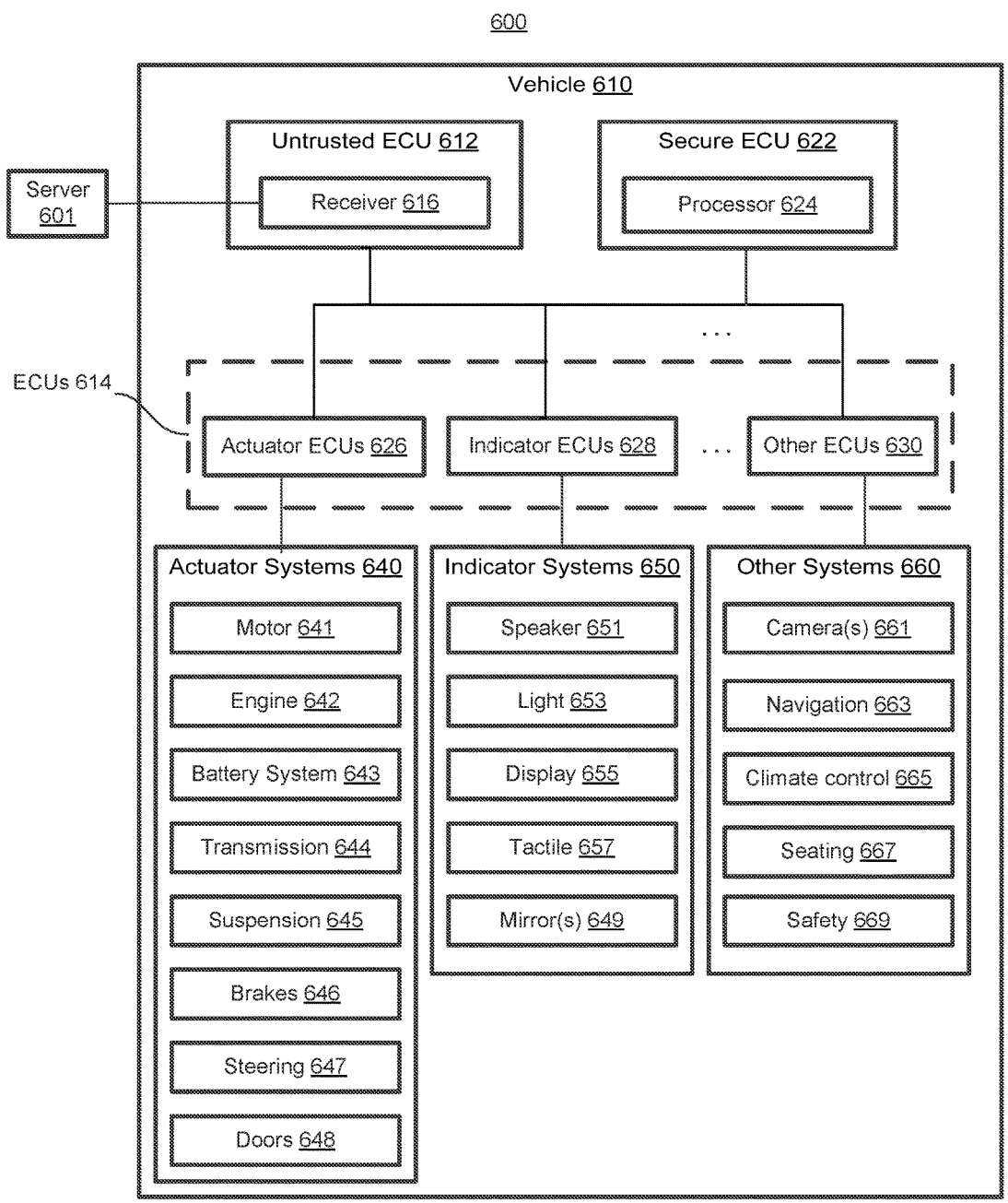
FIG. 6 illustrates an exemplary block diagram of an exemplary vehicle according to examples of the disclosure.

FIG. 6 illustrates a block diagram 600 of an exemplary vehicle according to examples of the disclosure. Block diagram 600 can include server 601 communicatively coupled to vehicle 610. Vehicle 610 can include untrusted ECU 612, secure ECU 622, a plurality of additional ECUs 614, including actuator system ECUs 626, indicator system ECUs 628, and other ECUs 630. Untrusted ECU 612 can include receiver 616. Secure ECU 622 can include processor 624. Vehicle 610 can further include one or more additional ECUs 614 and one or more actuator systems 640, indicator systems 650, and other systems 660. Exemplary actuator systems 640 include motor 641, engine 642, battery system 643, transmission gearing 644, suspension setup 645, brakes 646, steering 657, and doors 648. Exemplary indicator systems 650 include speaker 651, light 653, display 655, tactile indicator(s) 657, and one or more mirrors 649. Other systems 660 can include, for example, one or more cameras 661, navigation 663, climate control 665, seating 667, and one or more safety systems 669 (e.g., airbags, stabilization systems, seatbelts, etc.).

In some examples, receiver 616 included in untrusted ECU 612 can be communicatively coupled to server 601. Untrusted ECU 612 can be operatively coupled to one or more of secure ECU 622 and other ECUs 614 to perform a firmware update process to update the firmware on one or more of other ECUs 614 according to one or more examples described with reference to FIGS. 1-5. One or more additional ECUs 614 can be operatively coupled to one or more actuator systems 640, indicator systems 650, and/or other systems 660. In some examples, one ECU can control multiple systems and one system can be controlled in part by multiple ECUs. Additional and alternative systems, components, and configurations are possible.

Therefore, according to the above, some examples of the disclosure are related to a vehicle, comprising: an untrusted electronic control unit (ECU) comprising a receiver, a processor, and a memory, the receiver configured for receiving from a secure server a firmware update package including one or more firmware updates, and the memory of the untrusted ECU configured to store the firmware update package; a secure ECU operatively coupled to the untrusted ECU, the secure ECU configured for authenticating the firmware update package; and one or more target ECUs, each operatively coupled to the untrusted ECU and to the secure ECU, each respective target ECU comprising a bootloader configured for computing a checksum for a respective firmware update of the one or more firmware updates and signing the checksum with a unique key associated with the respective target ECU. Additionally or alternatively to one or more of the examples disclosed above, the firmware update package is encrypted with an asymmetric key and each of the one or more firmware updates is encrypted with the unique key corresponding to a respective target ECU of the one or more target ECUs. Additionally or alternatively to one or more of the examples disclosed above, the untrusted ECU is further configured for: decrypting the firmware update package; and transmitting a signed update command to the secure ECU. Additionally or alternatively to one or more of the examples disclosed above, the secure ECU is configured for: receiving a signed update command from the untrusted ECU, the signed update command indicative of the received firmware update package; authenticating the signed update command; and in accordance with a determination that the signed update command is authentic, transmitting a signed distribution command to initiate a transmission of one or more firmware updates to one or more target ECUs. Additionally or alternatively to one or more of the examples disclosed above, the secure ECU is configured for: in accordance with a determination that the signed updated command is inauthentic, transmitting a signed erase command to the untrusted ECU to initiate an erasure of the firmware update package. Additionally or alternatively to one or more of the examples disclosed above, the secure ECU is configured for: receiving the signed checksum from one or more target ECUs; verifying a signature of the signed checksum; verifying a result of the signed checksum; and in accordance with a determination that the signature is valid and the result is correct, transmitting one or more installation commands to the one or more target ECUs to install a respective firmware update corresponding to the signed checksum. Additionally or alternatively to one or more of the examples disclosed above, the secure ECU is configured for: in accordance with a determination that the signature is not valid or the result is incorrect, transmitting one or more erase commands to the one or more target ECUs to erase a respective firmware update corresponding to the signed checksum. Additionally or alternatively to one or more of the examples disclosed above, each unique key associated with each target ECU is a symmetric key.

Some examples of the disclosure are related to a method for updating firmware at a vehicle, the method comprising: receiving, from a secure server, a firmware update package including one or more firmware updates; storing the firmware update package at a memory of an untrusted electronic control unit (ECU); authenticating, with a secure ECU, the firmware update package; in accordance with a determination that the firmware update package is authentic: transmitting one or more firmware updates included in the firmware update package to one or more respective target ECUs; computing, with a bootloader included in a target ECU of the one or more respective target ECUs, a checksum for a respective firmware update; and signing, with the bootloader, the checksum using a unique key associated with the target ECU. Additionally or alternatively to one or more of the examples disclosed above, the firmware update package is encrypted with an asymmetric key and each of the one or more firmware updates is encrypted with the unique key corresponding to the respective target ECU. Additionally or alternatively to one or more of the examples disclosed above, the method further comprises, at the untrusted ECU: decrypting the firmware update package; and transmitting a signed update command to the secure ECU. Additionally or alternatively to one or more of the examples disclosed above, the method further comprises, at the secure ECU: receiving a signed update command from the untrusted ECU, the signed update command indicative of the received firmware update package; authenticating the signed update command; and in accordance with a determination that the signed update command is authentic, transmitting a signed distribution command to initiate a transmission of one or more firmware updates to one or more target ECUs. Additionally or alternatively to one or more of the examples disclosed above, the method further comprises, at the secure ECU:in accordance with a determination that the signed updated command is inauthentic, transmitting a signed erase command to the untrusted ECU to initiate an erasure of the firmware update package. Additionally or alternatively to one or more of the examples disclosed above, the method further comprises, at the secure ECU: receiving a signed checksum from one or more target ECUs; verifying a signature of the signed checksum; verifying a result of the signed checksum; and in accordance with a determination that the signature is valid and the result is correct, transmitting one or more installation commands to the one or more target ECUs to install a respective firmware update corresponding to the signed checksum. Additionally or alternatively to one or more of the examples disclosed above, the method further comprises, at the secure ECU: in accordance with a determination that the signature is not valid or the result is incorrect, transmitting one or more erase commands to the one or more target ECUs to erase a respective firmware update corresponding to the signed checksum. Additionally or alternatively to one or more of the examples disclosed above, each unique key associated with each target ECU is a symmetric key.

Some examples of the disclosure are related to a non-transitory computer-readable medium including instructions, which when executed by one or more processors, cause the one or more processors to perform a method for updating firmware at a vehicle, the method comprising: receiving, from a secure server, a firmware update package including one or more firmware updates; storing the firmware update package at a memory of an untrusted electronic control unit (ECU); authenticating, with a secure ECU, the firmware update package; in accordance with a determination that the firmware update package is authentic: transmitting one or more firmware updates included in the firmware update package to one or more respective target ECUs; computing, with a bootloader included in a target ECU of the one or more respective target ECUs, a checksum for a respective firmware update; and signing, with the bootloader, the checksum using a unique key associated with the target ECU.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A vehicle, comprising:
an untrusted electronic control unit (ECU) comprising a receiver, a processor, and a memory, the receiver configured for receiving from a secure server a firmware update package including one or more firmware updates, and the memory of the untrusted ECU configured to store the firmware update package;
a secure ECU operatively coupled to the untrusted ECU, the secure ECU configured for authenticating the firmware update package; and
one or more target ECUs, each operatively coupled to the untrusted ECU and to the secure ECU, each respective target ECU comprising a bootloader configured for computing a checksum for a respective firmware update of the one or more firmware updates and signing the checksum with a unique key associated with the respective target ECU.

2. The vehicle of claim 1, wherein the firmware update package is encrypted with an asymmetric key and each of the one or more firmware updates is encrypted with the unique key corresponding to a respective target ECU of the one or more target ECUs.

3. The vehicle of claim 1, wherein the untrusted ECU is further configured for:
decrypting the firmware update package; and
transmitting a signed update command to the secure ECU.

4. The vehicle of claim 1, wherein the secure ECU is configured for:
receiving a signed update command from the untrusted ECU, the signed update command indicative of the received firmware update package;
authenticating the signed update command; and
in accordance with a determination that the signed update command is authentic, transmitting a signed distribution command to initiate a transmission of one or more firmware updates to one or more target ECUs.

5. The vehicle of claim 4, wherein the secure ECU is configured for:
in accordance with a determination that the signed updated command is inauthentic, transmitting a signed erase command to the untrusted ECU to initiate an erasure of the firmware update package.

6. The vehicle of claim 1, wherein the secure ECU is configured for:
receiving the signed checksum from one or more target ECUs;
verifying a signature of the signed checksum;
verifying a result of the signed checksum; and
in accordance with a determination that the signature is valid and the result is correct, transmitting one or more installation commands to the one or more target ECUs to install a respective firmware update corresponding to the signed checksum.

7. The vehicle of claim 6, wherein the secure ECU is configured for:
in accordance with a determination that the signature is not valid or the result is incorrect, transmitting one or more erase commands to the one or more target ECUs to erase a respective firmware update corresponding to the signed checksum.

8. The vehicle of claim 1, wherein each unique key associated with each target ECU is a symmetric key.

9. A method for updating firmware at a vehicle, the method comprising:
receiving, from a secure server, a firmware update package including one or more firmware updates;
storing the firmware update package at a memory of an untrusted electronic control unit (ECU);
authenticating, with a secure ECU, the firmware update package;
in accordance with a determination that the firmware update package is authentic:

transmitting one or more firmware updates included in the firmware update package to one or more respective target ECUs;

computing, with a bootloader included in a target ECU of the one or more respective target ECUs, a checksum for a respective firmware update; and signing, with the bootloader, the checksum using a unique key associated with the target ECU.

10. The method of claim 9, wherein the firmware update package is encrypted with an asymmetric key and each of the one or more firmware updates is encrypted with the unique key corresponding to the respective target ECU.

11. The method of claim 9, further comprising, at the untrusted ECU:

decrypting the firmware update package; and transmitting a signed update command to the secure ECU.

12. The method of claim 9, further comprising, at the secure ECU:

receiving a signed update command from the untrusted ECU, the signed update command indicative of the received firmware update package;

authenticating the signed update command; and in accordance with a determination that the signed update command is authentic, transmitting a signed distribution command to initiate a transmission of one or more firmware updates to one or more target ECUs.

13. The method of claim 12, further comprising, at the secure ECU:

in accordance with a determination that the signed updated command is inauthentic, transmitting a signed erase command to the untrusted ECU to initiate an erasure of the firmware update package.

14. The method of claim 9, further comprising, at the secure ECU:

receiving a signed checksum from one or more target ECUs;

verifying a signature of the signed checksum;

verifying a result of the signed checksum; and in accordance with a determination that the signature is valid and the result is correct, transmitting one or more installation commands to the one or more target ECUs to install a respective firmware update corresponding to the signed checksum.

15. The method of claim 14, further comprising, at the secure ECU:

in accordance with a determination that the signature is not valid or the result is incorrect, transmitting one or more erase commands to the one or more target ECUs to erase a respective firmware update corresponding to the signed checksum.

16. The method of claim 9, wherein each unique key associated with each target ECU is a symmetric key.

17. A non-transitory computer-readable medium including instructions, which when executed by one or more processors, cause the one or more processors to perform a method for updating firmware at a vehicle, the method comprising:

receiving, from a secure server, a firmware update package including one or more firmware updates;

storing the firmware update package at a memory of an untrusted electronic control unit (ECU);

authenticating, with a secure ECU, the firmware update package;

in accordance with a determination that the firmware update package is authentic:

transmitting one or more firmware updates included in the firmware update package to one or more respective target ECUs;

computing, with a bootloader included in a target ECU of the one or more respective target ECUs, a checksum for a respective firmware update; and signing, with the bootloader, the checksum using a unique key associated with the target ECU.

* * * * *